United States Patent [19]
Jaggard

[11] 3,775,189
[45] Nov. 27, 1973

[54] FORMING SEALED HOUSING FOR ELECTROCHEMICAL CELLS

[75] Inventor: Arthur M. Jaggard, Apple Valley, Minn.

[73] Assignee: Gould Inc., Mendota Heights, Minn.

[22] Filed: Feb. 25, 1972

[21] Appl. No.: 229,416

[52] U.S. Cl. .................. 136/175, 136/86 A, 264/23, 264/249
[51] Int. Cl. .............................................. H01m 1/02
[58] Field of Search ................ 136/86 A, 86 R, 175; 204/286, 288, 297 R; 264/32, 248, 249; 156/306

[56] References Cited
UNITED STATES PATENTS

| | | | |
|---|---|---|---|
| 3,126,302 | 3/1964 | Drushella | 136/86 R |
| 3,432,358 | 3/1969 | Cairns | 136/86 R |
| 3,522,100 | 7/1970 | Lindstrom | 136/86 R |
| 3,533,845 | 10/1970 | Katsoulis | 136/86 A |
| 3,598,655 | 8/1971 | Hamlen et al. | 136/86 R |
| 3,660,166 | 5/1972 | Winsel | 136/86 D |

Primary Examiner—Donald L. Walton
Attorney—Marvin Jacobson et al.

[57] ABSTRACT

A process for forming an electrochemical cell housing by ultrasonically welding a first housing member to a second housing member to simultaneously form a leakproof support around the edges of the cathode of the cell and a leakproof joint between the battery housing members.

5 Claims, 5 Drawing Figures

PATENTED NOV 27 1973  3,775,189

FORMING SEALED HOUSING FOR ELECTROCHEMICAL CELLS

BACKGROUND OF THE INVENTION

1. Field of the Invention

This invention relates generally to forming heat-sealed housings for electrochemical cells and, more particularly, to a process for ultrasonically welding a heat-sealable housing together while forming a leakproof support around the edges of the cathode of a metal air cell.

2. Description of the Prior Art

One of the problems in the manufacture of heat-selable plastic housings for metal air cells, particularly those which use an electrolyte such as potassium hydroxide is that the elctrolyte leaks out of the cell unless the cell is tightly sealed. Because the electrolyte is toxic, it is necessary to prevent leakage of electrolyte from the cell if the cell is to be used commercially.

typically, the leakage problem occurs in gas diffusion hydrophobic cathodes which either contain a hydrophobic material or have a layer of hydrophobic material on the outside of the cathode. The hydrophobic cathode allows gas to diffuse into the cathode but prevents liquid from entering or leaving the cathode. One of the preferred hydrophobic materials is polytetrafluoroethylene (PTFE), however, other hydrophobic polymers have also been used with the cell cathode. One of the problems of using a hydrophobic cathode is that the edges of the cathode must be sealed in the cell housing to prevent liquid electrolyte from seeping around the edges of the cell. One of the prior art techniques of sealing the edges of the hydrophobic cathode has been to injection mold plastic around the cathode edges in a U shape so the plastic encapsulates the edges of the cathode. Next the cathode is placed in a cell housing where the injection molded edge must be sealed in the housing. One method of sealing the housing has been to use a heat sealable material and ultrasonically weld the housing together.

While it would be preferred to ultrasonically weld the housing to the hydrophobic cathode member to produce a leakproof seal, this is difficult if not impossible to do in the case of polytetrafluoroethylene because polytetrafluoroethylene will not respond well to ultrasonic welding. Thus, the prior art techniques have relied on injection molding a plastic strip around the edges of the cathode to form a seal between the edge of the cathode and the injection molded strip. Then the injection molded strip can be sealed to the housing in a single step.

still another prior art method of forming a seal between the hydrophobic cathode is to clamp a gasket against the face of the hydrophobic cathode to form a leakproof joint between the hydrophobic cathode and the gasket. However, this technique requires considerable amount of force and not well suited for small compact commercial cells which have to fit into small compartments in flash lights, etc. Thus, one feature of the present invention resides in the discovery that one can simultaneously form a leakproof seal between the hydrophobic cathode and the housing and ultrasonically fuse or weld mating sections of the cell housing.

Still another feature of the invention resides in the discovery of a welding method that accommodates variations in cathode thickness.

In a conventional metal air cell, the cathode assembly typically comprises a separator, a collector screen filled with a catalyst and carbon black, and a hydrophobic layer. To support the cathode assembly in the cell, it is preferred to seal the edges of the cathode assembly within the housing to prevent electrolyte from seeping around the edges of the cathode. However, because of the variation in the thickness of some cathode assemblies, it has been sometimes difficult to simultaneously form a seal between the housing and the sides of the housing while sealing the edges of the cathode between the housing and the sides of the housing. Thus, the present invention also includes an improved process for ultrasonically forming a leakproof joint around the edges of the cathodes of a metal air cell and between the housing members to thereby prevent leakage of electrolyte from the cell.

SUMMARY OF THE INVENTION

Briefly, the heart of the invention comprises a process for simultaneously forming a leakproof seal between the edge of the cathode and the housing and forming a leakproof housing. An improvement to the invention is a process for simultaneously forming a leakproof seal between the edges of the cathode and the housing and forming a leakproof housing while accommodating thickness variation in the cathodes.

DESCRIPTION OF THE PREFERRED EMBODIMENT

Figure 3:
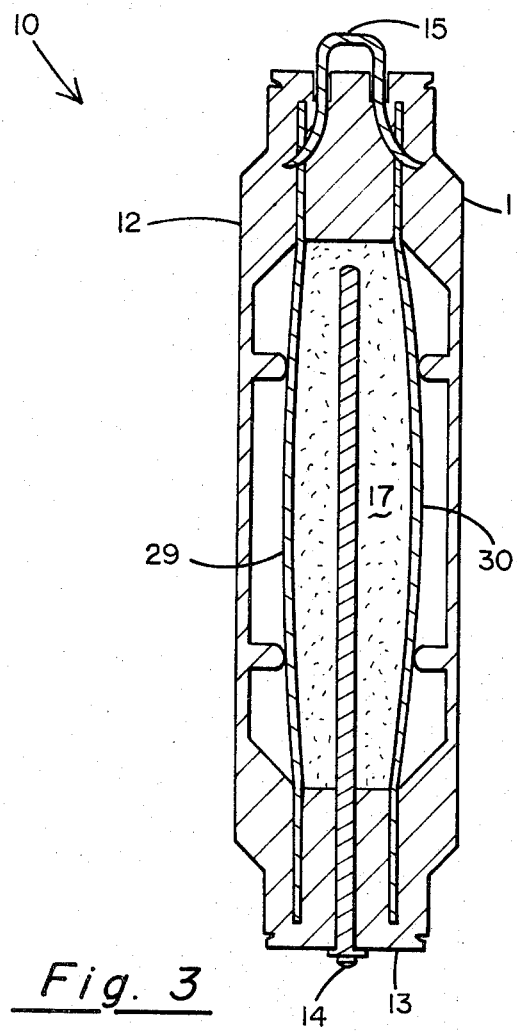
FIG. 3 shows a metal air cell in cross section taken along thelines 3—3 of FIG. 4.

Referring to the drawing, reference numeral 10 generally designates a metal air cell which utilizes the process of my invention. Generally, cell 10 comprises a pair of side members 11 and 12 which form mating engagement with a square shaped housing 13. Located in housing 13 is an anode pin current collector 14, an anode 17 and a cathode pin 15.

In order to illustrate the structural details of cell 10 as well as the process of forming the cell, reference should be made to FIGS. 1, 2, 3 and 5 which show sectional views of the cell. Located outside anode material 17 and against the surface of housing 13 are a pair of separators 18 and 19. Located adjacent to separators 18 and 19 are a pair of cathode collector screens 20 and 21. Cathode collector screens 20 and 21 typically contain a catalyst and cathode material such as carbon black dispersed throughout the screen. Located adjacent to collector screens 20 and 21 are a pair of hydrophobic members 22 and 23 which allow air to enter cell 10 but prevent liquid from escaping from the cell. Separator 18, collector screen 20 and hydrophobic member 22 are located adjacent to one another in a sandwich fashion which is referred to as a cathode assembly 29. Similarly, separator 19, collector screen 21 and hydrophobic member 23 are located adjacent to one another in a cathode assembly 30.

In the embodiment shown the hydrophobic members are located on the exterior of the cathode, however, the process is also suited for ohter types of hydrophobic cathodes including those in which the hydrophobic material is an integral part of the cathode.

Figure 2:
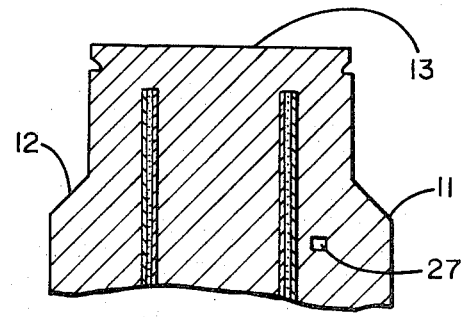
FIG. 2 is a partial side sectional view showing the electrode and housing in the assembled state.
Figure 5:
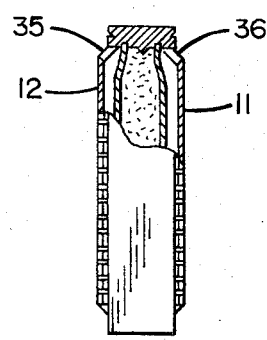
FIG. 5 shows the cross section of the metal air cell taken along lines 5—5 of FIG. 4.
Figure 4:
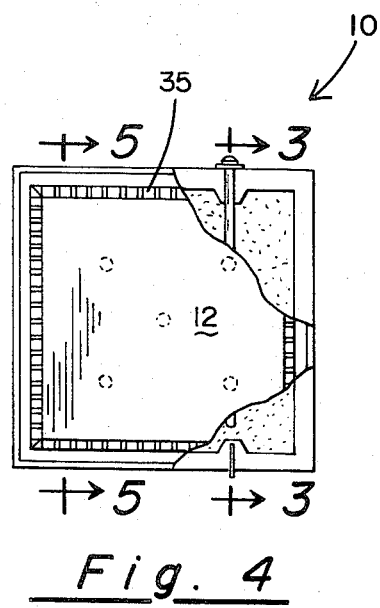
FIG. 4 shows a metal air cell in front elevation and partially cut away.

FIG. 2 shows cathode assembly 29 firmly held between housing 13 and side member 12, and cathode assembly 30 being held between housing 13 and side member 11. In this particular cell, the electrolyte is dispersed between the two hydrophobic member 22 and 23. Hydrophobic members 22 and 23 prevent any electrolyte from escaping through the cathode while allowing air to enter the cathode through the openings 35 in side member 12 and the openings 36 in side member 11. However, as the electrolyte could seep around the edges of the hydrophobic members and thus escape through openings 35 and 36, the edges of the cathode assembly must be sealed to prevent the leakage of electrolyte around the edges and along the outside face of the hydrophobic members. In my preferred embodiment, I utilize ultrasonic welding to simultaneously form a leakproof housing and a leakproof seal between the edges of the cathode assembly and the edges of the cell.

More particularly, my process involves the discovery that while I cannot ultrasonically weld the housing to the face of the hydrophobic cathode, I can soften the housing sufficiently to make it conform to the surface of the hydrophobic cathode by applying pressure and an ultrasonic signal to the housing. The ultrasonic signal causes the area of contact between the heat sealable housing sections to melt. Once the ultrasonic signal is removed, the material solidifies, thus producing a leakproof seal between adjoining housing section. However, at the same time, the hydrophotic cathode is squeezed or compressed between the cathode support area or surface of the housings. Even though the hydrophobic cathode does not weld or fuse itself to the cathode support area, the housing material melts sufficiently to closely conform to the surface of the hydrophobic cathode. It is this conforming of the housing to the hydrophobic cathode through the application of heat and pressure that produces a leakproof seal between the cathode and its housing.

While the actual range of compression pressure necessary to ultrasonically weld the housing depends on the materials used, sufficient pressure must be applied to the housing so that the area of the housing in contact with the surface of the hydrophobic cathode (such as polytetrafluoroethylene) will soften sufficiently to conform to the surface of the hydrophobic cathode. However, for most uses the compression pressure applied during ultrasonic welding should exceed about 20 psi.

Still another improvement to my process involves providing additional heat-sealable material in the form of a melt bead to aid in forming a leakproof seal between the housing sections.

Figure 1:
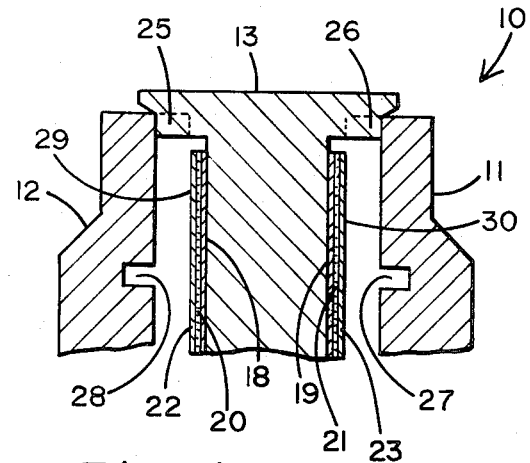
FIG. 1 is a partial side sectional view showing the housing and cathode assemblies in a preassembled state.

More particularly, FIG. 1 shows the unique housing construction prior to ultrasonically welding the housing 13 to the side member 11 and side member 12. In the preassembled state, housing 13 contains a bead or melt region 25 and a bead or melt region 26. These regions extend around the entire periphery of cell 10. Note, in the preassembled state, melt regions 25 and 26 prevent side members 11 and 12 from contacting the surface of cathode assemblies 27 and 28. When the ultrasonic signal is applied to housing 13 and side members 11 and 12, the heat produced by the frictional forces melts regions 25 and 26 thus causing the heat-sealable material to flow around the edge of cathode assemblies 29 and 30, however, this bead is only preferred and is not necessary to the main process of the invention.

Another feature of my invention is that I have discovered I can also accommodate variation in cathode assembly thickness by placing a first recess 27 in side member 11 and similarly, by placing a second recess 28 in housing member 12. These recess regions continue around the entire periphery of cell 10.

The function of the recess regions is to receive or accommodate excess softened material on the cathode support area. That is, if the cathode assembly is oversized then application of minimum compression pressure may not allow the housing sections to come together sufficiently to form a leakproof joint therebetween. Thus the recess region allows the softened material on the cathode support area to flow laterally thus allowing the housing sections to be compressed together until a proper weld can be formed between the adjoining surfaces of the housing sections. However, this step of forming recess regions in the cathode support areas of the housing is only necessary if the cathodes vary greatly in thickness.

Thus, according to my invention I assemble a gas diffusion cathode in an electrochemical cell housing by first forming a housing having a cathode supporting surface and a heat sealing surface. I then form at least one other housing also having a cathode supporting surface and a heat sealing surface. Next, I position the gas diffusion cathode on one of the cathode supporting surfaces of one of the housings. In this position the edges of the gas diffusion cathode are entirely supported by the cathode supporting surface of the housing. In the next step I place the other housing which contains a similar cathode supporting surface on top of the gas diffusion cathode. This step places the edges of the cathode between the cathode supporting surfaces of the two housings. Next, I compress the housing together to tightly squeeze the gas diffusion cathode between the cathode supporting surfaces of the two housings. While the cathode is under pressure I apply an ultrasonic signal to the housing which causes the heat sealable surfaces of the two housings to weld or fuse together. During welding of the heat sealable surfaces, the material on the cathode supporting surface of the housing, which is under pressure, softens and conforms to the surface of the hydrophobic cathode to provide a leakproof seal between the outside face of the hydrophobic cathode and the cathode supporting surface. In the final step I allow The heat-sealed surfaces to cool and harden before removing the pressure on the housing. Because the housing has been welded into an integral unit while the cathode has been under pressure, the cathode will continue to be forcefully held between the cathode-supporting surfaces thus producing a leakproof seal between the cathode and the cathode-supporting surface.

In order to assemble the housing components with the configuration of the embodiment shown herein, I ultrasonically weld the heat-sealable materials together. Basically, the ultrasonic welding employs high-frequency mechanical vibrations that melt adjoining surfaces thus fusing them together in a strong molecular bond. The melting is accomplished by channeling the mechanical vibrations at either 20 kilohertz or 40 kilohertz into a driver called a horn. The horn is then positioned to compress the pieces to be welded together. Briefly, there are two methods of converting electrical energy into mechanical vibrations, namely, magnetostrictive and electrostrictive. In the electrostrictive conversion, a piezoelectric element or crystal expands and contracts when an electrical signal is applied thereto. In the magnetostrictive conversion, a metal core vibrates under the influence of a magnetic field. Typically, the ultrasonic welding of plastics is well known and such welding factors as the power, time and pressure can vary within a wide range and are routinely selected by those in the welding art. Similarly, the materials that can be welded ultrasonically are any of the heat-sealable materials which include such typical plastics as polystyrene, acrylonitrile-butadiene-styrene, polycarbonate, polyethylene and many others which are well known to those in the art. Thus, the only limitation on the materials used in the cell housing is that the materials are heat-sealable and can withstand the corrosive materials with the cell which is characteristic of many of the polymer plastics.

While the invention has been described with respect to assembly of a bicell (two cathodes in a single cell), it is apparent that the process is also suitable for use with assembly of cells having a single cathode or electrode.

I CLAIM:

1. A method of simultaneously forming a leakproof seam in an electrochemical cell housing and forming a leakproof interface between a hydrophobic electrode and an electrode supporting surface comprising the steps of:

forming a first housing having an electrode supporting surface and a heat sealable surface;

forming a second housing having an electrode supporting surface and a heat-sealable surface;

positioning a hydrophobic electrode having an area to be sealed against the electrode supporting surface of the first housing;

positioning the second housing on the hydrophobic electrode to thereby place the electrode-supporting surface of said second housing against the hydrophobic electrode and the heat-sealable surface of said second housing against the heat-sealable surface of the first housing;

compressing the heat-sealable surface of the first housing against the heat-sealable surface of the second housing;

fusing the heat-sealable surface of the first housing to the heat-sealable surface of the second housing while compressing the hydrophobic electrode between the electrode-supporting surface of the first housing and the electrode-supporting surface of the second housing to thereby soften at least one of the electrode-support surfaces to thereby produce a leakproof seal between the electrode-support surface and the hydrophobic electrode.

2. The method of claim 1 including the step of forming a recess in the electrode supporting surface of one of the housings to accommodate electrodes of different thickness.

3. The method of claim 1 including the step of forming a melt bead on one of the heat-sealable surfaces of the housing.

4. The method of claim 3 including the step of forming a recess between the edge of the electrode and the first heat-sealable material to thereby receive excess melted heat-sealable material.

5. The method of claim 1 including ultrasonically welding the heat-sealable surface of the first housing to the heat-sealable surface of the second housing.

* * * * *